US009940079B2

(12) United States Patent
Nakahara

(10) Patent No.: US 9,940,079 B2
(45) Date of Patent: Apr. 10, 2018

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Toshiaki Nakahara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 319 days.

(21) Appl. No.: 14/837,451

(22) Filed: Aug. 27, 2015

(65) Prior Publication Data

US 2016/0283175 A1 Sep. 29, 2016

(30) Foreign Application Priority Data

Mar. 26, 2015 (JP) ................................. 2015-064306

(51) Int. Cl.
G06F 3/12 (2006.01)
G06F 13/42 (2006.01)
G06F 13/40 (2006.01)
G06F 13/38 (2006.01)

(52) U.S. Cl.
CPC .......... *G06F 3/1236* (2013.01); *G06F 3/1206* (2013.01); *G06F 3/1285* (2013.01); *G06F 13/385* (2013.01); *G06F 13/404* (2013.01); *G06F 13/4286* (2013.01)

(58) Field of Classification Search
CPC ..... G06F 3/1236; G06F 3/1231; G06F 13/404
See application file for complete search history.

(56) References Cited

FOREIGN PATENT DOCUMENTS

JP 2004-355511 A 12/2004
JP 2010-49676 A 3/2010

Primary Examiner — Farley Abad
(74) Attorney, Agent, or Firm — Sughrue Mion, PLLC

(57) ABSTRACT

An information processing apparatus includes a first interface that receives data described in a first protocol with an address and a port number over a communication network, and transmits the data to a transmission destination indicated by the address and the port number, a second interface that receives data described in a second protocol via a communication path different from the communication network, a first processor that processes data having a predetermined port number attached thereto, described in the first protocol, and received via the first interface, a second processor that processes data, not containing a portion that is described in the first protocol, of the data received via the second interface, and a supplier that attaches the address and the port number to the data received via the second interface and supplies the data with the address and the port number attached thereto to the first interface.

20 Claims, 4 Drawing Sheets

| MANAGEMENT ITEM | FIRST PARAMETER | SECOND PARAMETER |
|---|---|---|
| TIMEOUT VALUE | 30 SECONDS | 60 SECONDS |
| PAGE DESCRIPTION LANGUAGE | PS | PLW |
| : | : | : |

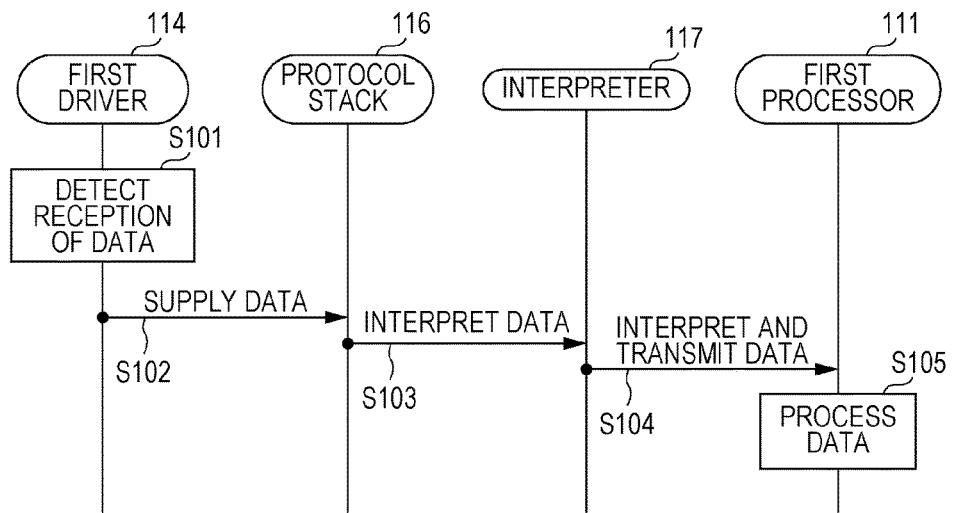
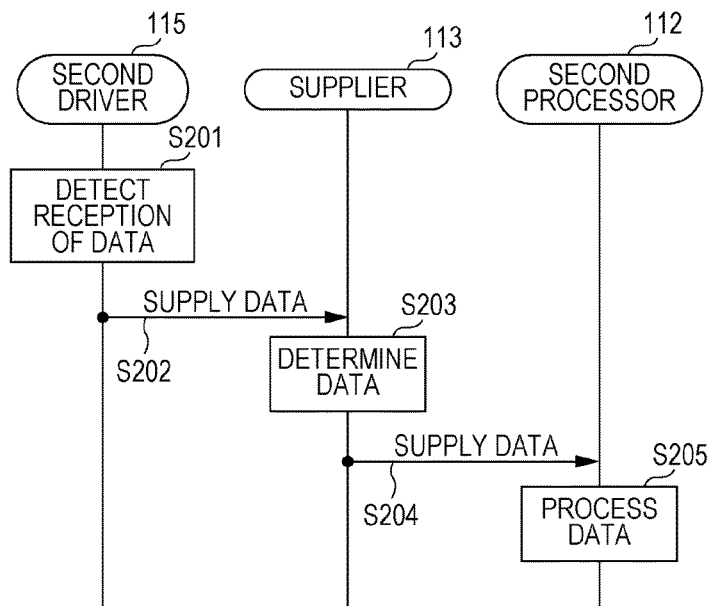

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-064306 filed Mar. 26, 2015.

BACKGROUND (i) Technical Field

The present invention relates to an information processing apparatus, an information processing method, and a non-transitory computer readable medium.

(ii) Related Art

Some of the currently available information processing apparatuses include an interface configured to connect to a communication network, such as a local area network (LAN), a wide area network (WAN), or a transmission control protocol/Internet protocol (TCP/IP) network, and an interface configured to connect to a serial communication cable, such as a universal serial bus (USB). Such an information processing apparatus may receive data from a terminal apparatus connected to the TCI/IP network, performs a variety of application programs on the data for predetermined functions. The data exchanged between the terminal apparatus and the information processing apparatus is described in a protocol of a predetermined network. For example, if an application program to be executed on the information processing apparatus is a Web server, the data exchanged therebetween is described in the communication protocol of hypertext transfer protocol (HTTP). The information processing apparatus interprets a header portion, described in the HTTP protocol, of the data received via a network interface, and hands the data body portion over to the application program, thereby processing the received data by the application program.

SUMMARY

According to an aspect of the invention, there is provided an information processing apparatus. The information processing apparatus includes a first interface that is connected to a communication network, receives data described in a first protocol with an address and a port number over the communication network attached to the data, and transmits the data to a transmission destination indicated by the address and the port number, a second interface that receives data described in a second protocol via a communication path different from the communication network, a first processor that processes data having a predetermined port number attached thereto, described in the first protocol, and received via the first interface, a second processor that processes data, not containing a portion that is described in the first protocol, of the data received via the second interface, and a supplier that, with the data received via the second interface containing data described in the first protocol, attaches the address and the port number of the information processing apparatus over the communication network to the data received via the second interface and supplies the data with the address and the port number attached thereto to the first interface.

BRIEF DESCRIPTION OF THE DRAWINGS

Exemplary embodiments of the present invention will be described in detail based on the following figures, wherein:

FIG. 5 illustrates an operation in which a first driver supplies data to a first processor;

FIG. 6 illustrates an operation in which a second driver supplies data to a second processor;

DETAILED DESCRIPTION

Figure 1:
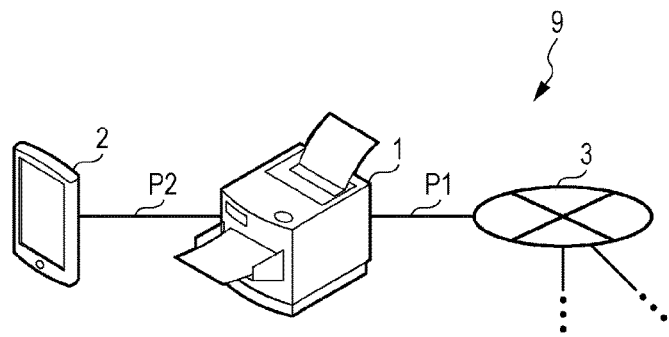
FIG. 1 generally illustrates an image forming system of an exemplary embodiment.

FIG. 1 generally illustrates an image forming system 9 of an exemplary embodiment. Referring to FIG. 1, the image forming system 9 includes an image forming apparatus 1, a terminal apparatus 2, and a communication network 3.

The image forming apparatus 1 is connected to an external apparatus (not illustrated) via a first communication path P1 including the communication network 3, while also being connected to the terminal apparatus 2 on a one-to-one basis via a second communication path P2 not including the communication network 3. As illustrated in FIG. 1, one image forming apparatus 1, one terminal apparatus 2, and one communication network 3 are used. Alternatively, however, multiple apparatuses or networks may be used. The second communication path P2 is different from the first communication path P1.

Figure 2:
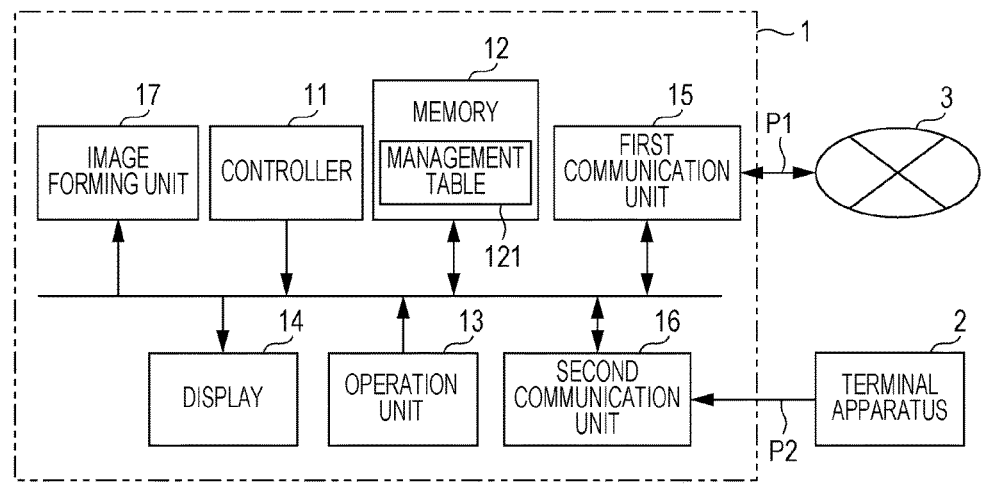
FIG. 2 illustrates the configuration of an image forming apparatus of the exemplary embodiment.

FIG. 2 illustrates the configuration of the image forming apparatus 1 of the exemplary embodiment. A controller 11 in the image forming apparatus 1 includes a central processing unit (CPU), a read-only memory (ROM), and a random-access memory (RAM), and controls the elements of the image forming apparatus 1 by the CPU reading and then executing a computer program (hereinafter simply referred to a program) from the ROM, or a memory 12.

A first communication unit 15 in the image forming apparatus 1 is connected to the communication network 3, and functions as a communication interface configured to perform data communication via the first communication path P1 including the communication network 3. The first communication unit 15 is a communication interface, such as Ethernet (registered trademark).

A second communication unit 16 in the image forming apparatus 1 is a communication interface that is directly connected to the terminal apparatus 2 via the second communication path P2 and configured to perform data communication. The second communication unit 16 is an interface, such as a USB interface, connected via a bus, and receives data via the bus.

An image forming unit 17 in the image forming apparatus 1 forms an image on a medium, such as a paper sheet, by fixing toner on the medium through an electrophotographic system under the control of the controller 11.

An operation unit 13 in the image forming apparatus 1 includes controls, such as an operation button or a touchpanel, to provide a variety of instructions. The operation unit 13 supplies to the controller 11 a signal responsive to the contents of an operation when a user operates the operation unit 13.

A display 14 in the image forming apparatus 1 includes a liquid-crystal display. Under the control of the controller 11, the display 14 displays information stored on the memory 12. The display 14 and the operation unit 13 may form a touchpanel.

A memory 12 in the image forming apparatus 1 is a storage unit, such as a hard disk drive or a solid-state drive, and stores a large amount of data for a long period of time. The memory 12 also stores a program to be read onto a central processing unit (CPU) of the controller 11. The memory 12 stores a management table 121.

Figures 3, 4:
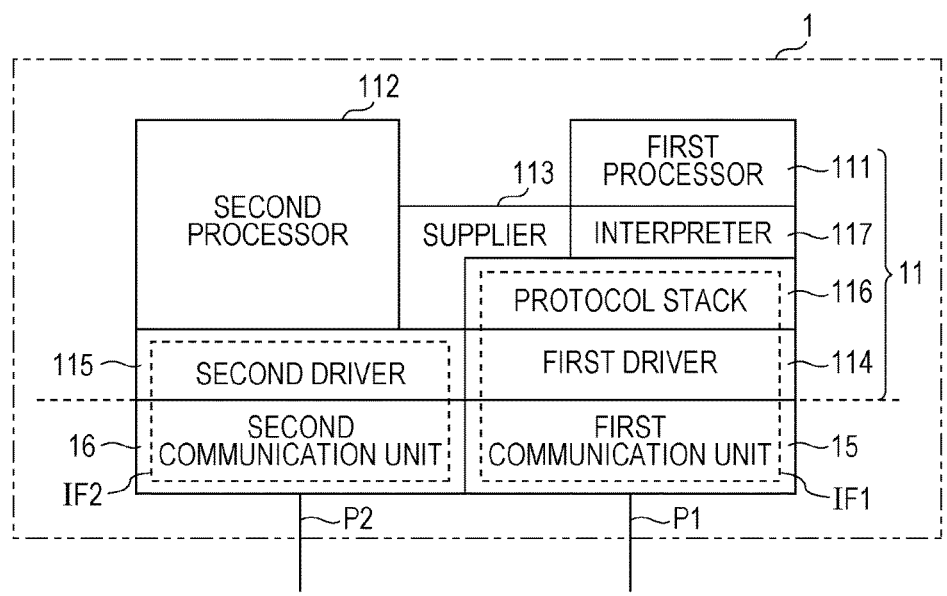
FIG. 3 illustrates a management table.
FIG. 4 is a functional block diagram of the image forming apparatus.

FIG. 3 illustrates the management table 121. The management table 121 describes a first parameter that is applied to data received by the first communication unit 15, and a second parameter that is applied to data received by the second communication unit 16. Items of the parameters applied to each piece of data include a time-out value representing a waiting response time used to determine whether a connection is disconnected or not, and a page description language in accordance with which data instructing image forming is described. The controller 11 controls the first communication unit 15 in response to the first parameter described in the management table 121, and the second communication unit 16 in response to the second parameter described in the management table 121.

FIG. 4 is the functional block diagram of the image forming apparatus 1. The controller 11 in the image forming apparatus 1 executes a program stored on the memory 12, and thus works as a first processor 111, a second processor 112, a supplier 113, a first driver 114, a second driver 115, the protocol stack 116, and an interpreter 117.

The first driver 114 is a device driver that is built in an operating system, for example. The first driver 114 controls the first communication unit 15, thereby interfacing for communications of data with an application to be executed by the controller 11. The second driver 115 is a device driver, for example, and controls the second communication unit 16, thereby interfacing for communications of data with an application to be executed by the controller 11.

The protocol stack 116 is a software program that interprets data in which multiple communication protocols, such as transmission control protocol (TCP) and Internet protocol (IP), are multi-layered. The communication protocol includes an address and a port number over the communication network 3. The protocol stack 116 interprets a header, described in TCP/IP, of the received data, extracts data having the address and the port number attached thereto, and transmits the data to a destination having the address and the port number.

The first driver 114, the protocol stack 116, and the first communication unit 15 function as a first interface IF 1 that connects the image forming apparatus 1 to a first communication path P1.

The second driver 115 and the second communication unit 16 function as a second interface IF 2 that connects the image forming apparatus 1 to a second communication path P2.

The interpreter 117 is a software program that interprets the protocol of data that is generated through the interpretation operation of the protocol stack 116. The protocol interpreted by the protocol stack 116 is a lower layer protocol closer to hardware (the first communication unit 15 in this case). On the other hand, the protocol interpreted by the interpreter 117 is a higher layer protocol (hereinafter referred to as a basic protocol) interpreted by an application program executed by the controller 11. The interpreter 117 is the hypertext transfer protocol (HTTP), for example.

The first processor 111 is an application program to be executed by the controller 11, and processes data that is described in a protocol that is an extension protocol of the basic protocol interpreted by the interpreter 117 (hereinafter referred to as an extension protocol). The extension protocol is an extension protocol of HTTP, such as an Internet printing protocol (IPP), configured to exchange print data via the communication network 3 and to form an image. The following discussion is based on the premise that the extension protocol is used to form an image via the communication network 3. The first processor 111 processes the data described in the extension protocol and received via the first interface IF 1, thereby causing the image forming unit 17 to form an image responsive to the data.

The device driver is built in the operating system, and controls the image forming unit 17 to interface for communications of data with an application executed by the controller 11. The discussion of the device driver is omitted.

The second processor 112 is an application program to be executed by the controller 11, and processes the data received by the second interface IF 2. For example, the second processor 112 is a USB print program that prints the print data input via a USB interface. The data received by the second interface IF 2 has a USB header attached thereto, and contains a portion that is described in a protocol different from a protocol of the data received by the first interface IF 1. The data received by the second interface IF 2 is difficult to interpret even if the data is read onto the first interface IF 1.

The operating system executes application programs, such as the first processor 111 and the second processor 112, on the controller 11 in a parallel fashion, using, for example, a time sharing system (TSS). The operating system attaches unique port numbers respectively to the application programs for identification. The first processor 111 and the second processor 112 receive, from the operating system, data having the port numbers identical to the port numbers respectively attached thereto and then process these pieces of data.

The supplier 113 is software that analyzes data received by the second interface IF 2, and, in response to analysis results, determines a configuration that processes the data. More specifically, the supplier 113 analyzes the USB header of the data received by the second interface IF 2 working as a USB interface. Upon determining that the data does not contain data described in the basic protocol (HTTP) or the extension protocol (IPP), the supplier 113 supplies the data to the second processor 112.

The supplier 113 may analyze the data received by the second interface IF 2 and determine that the data contains a portion described in the extension protocol. The supplier 113 then attaches to the data the address of the image forming apparatus 1 over the communication network 3 and the port number assigned to the first processor 111, and then supplies the data to the protocol stack 116 of the first interface IF 1. The protocol stack 116 transmits the data supplied from the supplier 113 to the first processor 111 as a destination indicated by the address of the image forming apparatus 1 and the port number via the interpreter 117.

An operation of attaching the address of an image forming apparatus to data, then supplying the data to a communication interface, and causing the communication interface to return the data to the image forming apparatus is referred to as local loop feedback. The address of the image forming apparatus is "127.0.0.0/8" in Internet protocol version 4 (IPv4), or "::1/128" in IPv6.

FIG. 5 illustrates an operation in which the first driver 114 supplies data to the first processor 111. When the first communication unit 15 detects the reception of the print data containing a portion described in the IPP protocol (step S101), the first driver 114 supplies the received data to the protocol stack 116 (step S102). The protocol stack 116 interprets the header, described in TCP/IP, of the supplied data, extracts the destination and port information, acquires the data of the HTTP header described in HTTP as the basic protocol, and hands the data over to the interpreter 117 (step S103).

The interpreter 117 retrieves from the protocol stack 116 the data described in the HTTP header as the basic protocol, interprets the data, acquires the data described in IPP as the extension protocol, and then transmits the data to the first processor 111 (step S104).

Upon receiving the data described in IPP as the extension protocol, the first processor 111 performs a printing operation of data as a print target contained in the data, based on information related to printing control described in the received data (step S105). In this way, the image forming unit 17 in the image forming apparatus 1 forms on a medium an image based on the data received by the first interface IF 1.

FIG. 6 illustrates an operation in which the second driver 115 supplies the data to the second processor 112. Upon detecting the reception of data by the second communication unit 16 working as a USB interface (step S201), the second driver 115 interprets the USB header of the received data, and then supplies the body of the data to the supplier 113 (step S202).

The supplier 113 interprets the data supplied by the second driver 115, and thus determines whether the data contains data described in HTTP as the basic protocol or in IPP as the extension protocol (step S203). This determination may be performed by examining the described contents of the data or by interpreting an instruction contained in the data.

Upon determining that the data supplied by the second driver 115, namely, the data received by the second interface IF 2 contains no data described in HTTP as the basic protocol or in IPP as the extension protocol, the supplier 113 supplies the data to the second processor 112 working as an application program processing the USB data (step S204).

Upon receiving the data supplied from the supplier 113, the second processor 112 processes the received data (step S205).

Figure 7:
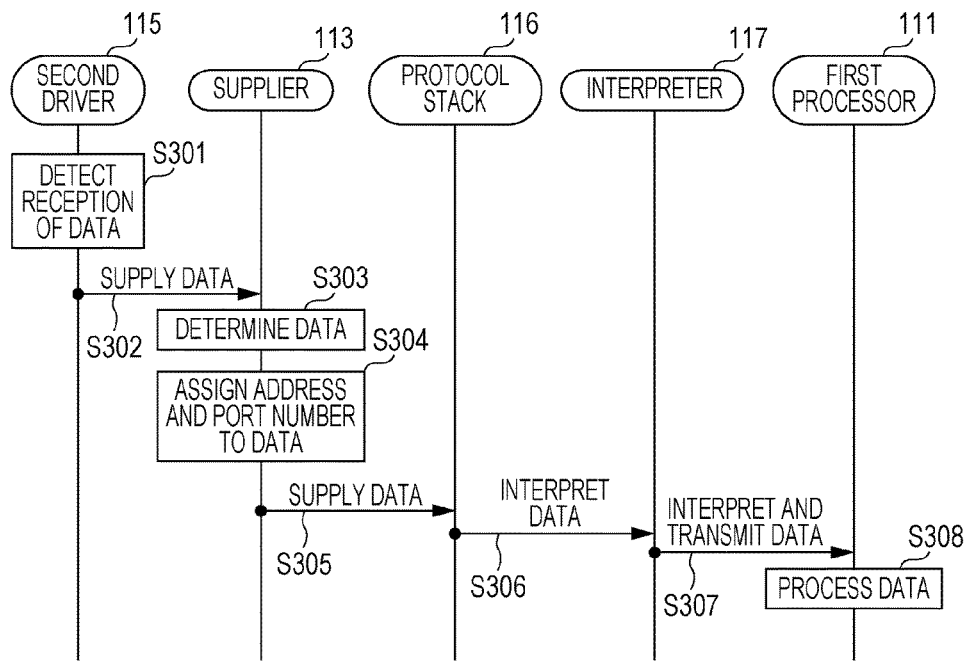
FIG. 7 illustrates an operation in which the second driver supplies data to the first processor.

FIG. 7 illustrates an operation in which the second driver 115 (a USB driver, for example) supplies data to the first processor 111 (an IPP processor, for example) via the second communication unit 16 and the second interface IF 2 (a USB interface, for example). Upon detecting the reception of the data by the second communication unit 16 (step S301), the second driver 115 interprets the USB header of the received data, and supplies data, other than the USB header, of the received data to the supplier 113 (step S302).

The supplier 113 interprets the data supplied from the second driver 115, and then determines whether the data contains data described in the basic protocol or the extension protocol (step S303).

Upon determining that the data supplied by the second driver 115, namely, the data received by the second interface IF 2 contains data described in the basic protocol or in the extension protocol, the supplier 113 attaches to the data the address of the image forming apparatus over the communication network 3 and the port number assigned to the first processor 111 (step S304). The supplier 113 then supplies to the protocol stack 116 the data with the address and port number attached thereto (step S305). The operation of supplying the data from the supplier 113 to the protocol stack 116 is similar to the operation in which the terminal apparatus connected to the first communication path P1 generates the print data in the IPP, and transmits the generated print data, the first interface IF 1 receives the data, the first driver 114 interpreting TCP/IP interprets the data, extracts data containing the print data in IPP, and then supplies the extracted data to the protocol stack 116.

Upon receiving the data from the supplier 113, the protocol stack 116 interprets the header of the data, and acquires data described in HTTP as the basic protocol. The protocol stack 116 interprets the address and the port number attached to the data, identifies the first processor 111 of the image forming apparatus as a destination of the data, and then transmits the data described in HTTP as the basic protocol to the interpreter 117 (step S306).

The interpreter 117 interprets the HTTP header of the data received from the protocol stack 116, acquires data described in IPP as the extension protocol, and then transmits the data to the first processor 111 (step S307).

Upon receiving the data described in IPP as the extension protocol, the first processor 111 processes data as a print target contained in the received data in accordance with information related to printing control described in the received data (step S308). The image forming unit 17 in the image forming apparatus 1 forms on a medium an image based on the data received via the second interface IF 2.

Figure 8:
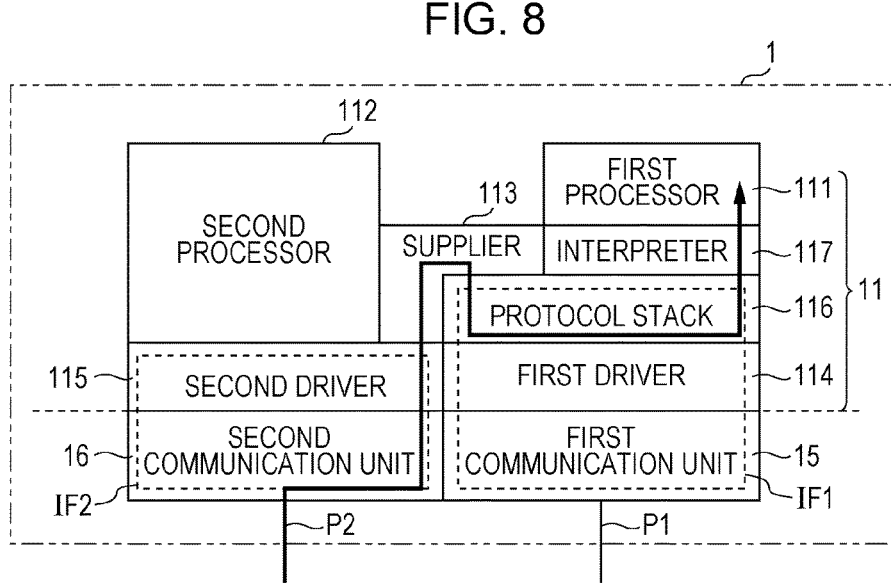
FIG. 8 illustrates how data flows when data described in an extension protocol is received by a second interface.

FIG. 8 illustrates how data flows when the data described in the extension protocol is received by the second interface IF 2. The supplier 113 performs the operations in steps S303 through S305 of FIG. 7, and the second interface IF 2 receives the data containing data described in IPP as the extension protocol. The second interface IF 2 attaches to the data the address and the port number to transmit the data to the first processor 111, and supplies the data to the protocol stack 116 in a method similar to the method in which the first driver 114 supplies the data to the protocol stack 116.

The data described in the extension protocol and received by the second interface IF 2 is handed over to the protocol stack 116 and the interpreter 117 via the supplier 113 as illustrated in FIG. 8. The data then reaches the first processor 111, and is processed by the first processor 111. More specifically, regardless of whether the data is received via the first interface IF 1 or the second interface IF 2, the first processor 111 processes the data described in the extension protocol. User friendliness in operation is thus increased.

In the image forming apparatus 1, the supplier 113 processes the data received by the second interface IF 2 to be routed in the local loop back without being involved in the modification of the protocol stack 116 and the interpreter 117 to be compatible with the second interface IF 2. The resulting data is thus processed by the first processor 111.

The exemplary embodiment has been described. The exemplary embodiment may be modified as described below. The modifications described herein may be combined.

First Modification

When the first processor 111 processes data, the display 14 may display information concerning as to whether the data is the data received by the second interface IF 2. The supplier 113 implemented by the controller 11 analyzes the data received by the second interface IF 2. Upon determining that the data received by the second interface IF 2 contains a portion described in the extension protocol, the supplier 113 attaches to the data the address of the image forming apparatus 1 and the port number of the first processor 111, and supplies the resulting data to the protocol stack 116 of the first interface IF 1. The supplier 113 causes the display 14 to display an image indicating that the data to be processed by the first processor 111 is the data received by the second interface IF 2. In such a case, the controller 11 may control the display 14, thereby displaying a message "IPP printing (USB)".

The user may recognize that the data to be processed by the first processor 111 is the data received by the second interface IF 2 when the first processor 111 processes the data received by the second interface IF 2. As long as the user is notified of the contents of the message described above, the notification unit is not limited to the display 14. For example, using voice or vibration, the image forming apparatus 1 may notify the user that the first processor 111 processes the data received by the second interface IF 2.

Second Modification

The memory 12 may save the first parameter that is used when the first processor 111 processes the data received by the first interface IF 1 and the second parameter that is used when the second processor 112 processes the data received by the second interface IF 2.

If a parameter that the first processor 111 is to use to process data is described in the data, the first processor 111 processes the data using the parameter described in the data. If no parameter is described, the first processor 111 processes the data using the first parameter.

If the data received by the second interface IF 2 is the data described in the extension protocol, the supplier 113 attaches to the data the address of the image forming apparatus 1 and the port number of the first processor 111, describes the second parameter on the data, and then supplies the resulting data to the first interface IF 1.

In the second modification, the second parameter that the second processor 112 is to use to process the data received by the second interface IF 2 is also used for the first processor 111 to process the data.

Third Modification

The image forming apparatus 1 of FIG. 2 includes the image forming unit 17. The image forming apparatus 1 may include an interface configured to transmit an instruction to form an image to another image forming apparatus. In such a case, the image forming apparatus 1 may be a processing apparatus without the image forming unit 17. The process to be performed by the processing apparatus is not limited to image forming. The processing apparatus may perform a reading operation to read an image formed on a medium in response to an instruction from the image forming apparatus 1.

Fourth Modification

The program to be executed by the controller 11 in the image forming apparatus 1 may be supplied in a stored state on one of non-transitory computer readable recording media. The non-transitory computer readable recording media include a magnetic recording medium, such as a magnetic tape or a magnetic disk, an optical recording medium, such as an optical disk, a magneto-optical recording medium, and a semiconductor recording memory. The program may be downloaded via a communication network, such as the Internet. The controller 11 may include not only a CPU but also a variety of devices. For example, the controller 11 may include a dedicated processor.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first interface connected to a communication network,
      wherein the first interface is configured to receive data described in a first protocol with an address and a port number over the communication network attached to the data, and
      wherein the first interface is configured to transmit the data to a transmission destination indicated by the address and the port number;
   a second interface configured to receive data described in a second protocol via a communication path different from the communication network;
   a first processor configured to process data having a predetermined port number attached thereto, described in the first protocol, and received via the first interface;
   a second processor configured to process data, not containing a portion that is described in the first protocol, of the data received via the second interface; and
   a supplier configured to analyze the data received via the second interface to determine that the data received via the second interface contains data described in the first protocol, to attach an address and a port number of the information processing apparatus on the communication network to the data received via the second interface and to supply the data with the address and the port number attached thereto to the first interface.

2. The information processing apparatus according to claim 1, further comprising a notification unit configured to notify information indicating that the data to be processed by the first processor is the data received via the second interface in a case where the data to be processed by the first processor is the data received via the second interface.

3. The information processing apparatus according to claim 2, further comprising a memory unit configured to save a first parameter that is used when the first processor processes the data received by the first interface, and a second parameter that is used when the second processor processes the data received by the second interface,
   wherein the first processor is configured to process the data using a parameter described in the data in a case where the parameter to be used in processing of the data is described in the data, and to process the data using the first parameter in a case where the parameter to be used in the processing of the data is not described in the data, and wherein the supplier is configured to, in a case where the data received by the second interface is the data described in the first protocol, describe the second parameter on the data before supplying the data to the first interface.

4. The information processing apparatus according to claim 3, wherein the parameter to be used in the processing of the data comprises a time-out value indicating a waiting response time that is used to determine whether a connection via the first interface or the second interface is disconnected or not.

5. The information processing apparatus according to claim 4, wherein the first protocol comprises transmission control protocol and Internet protocol (TCP/IP).

6. The information processing apparatus according to claim 4, wherein the second interface is configured to receive the data via a bus.

7. The information processing apparatus according to claim 3, wherein the first protocol comprises transmission control protocol and Internet protocol (TCP/IP).

8. The information processing apparatus according to claim 3, wherein the second interface is configured to receive the data via a bus.

9. The information processing apparatus according to claim 2, wherein the first protocol comprises transmission control protocol and Internet protocol (TCP/IP).

10. The information processing apparatus according to claim 2, wherein the second interface is configured to receive the data via a bus.

11. The information processing apparatus according to claim 1, further comprising a memory unit configured to save a first parameter that is used when the first processor processes the data received by the first interface, and a second parameter that is used when the second processor processes the data received by the second interface,
wherein the first processor is configured to process the data using a parameter described in the data in a case where the parameter to be used in processing of the data is described in the data, and to process the data using the first parameter in a case where the parameter to be used in the processing of the data is not described in the data, and
wherein the supplier is configured to, in a case where the data received by the second interface is the data described in the first protocol, describe the second parameter on the data before supplying the data to the first interface.

12. The information processing apparatus according to claim 11, wherein the parameter to be used in the processing of the data comprises a time-out value indicating a waiting response time that is used to determine whether a connection via the first interface or the second interface is disconnected or not.

13. The information processing apparatus according to claim 12, wherein the first protocol comprises transmission control protocol and Internet protocol (TCP/IP).

14. The information processing apparatus according to claim 12, wherein the second interface is configured to receive the data via a bus.

15. The information processing apparatus according to claim 11, wherein the first protocol comprises transmission control protocol and Internet protocol (TCP/IP).

16. The information processing apparatus according to claim 11, wherein the second interface is configured to receive the data via a bus.

17. The information processing apparatus according to claim 1, wherein the first protocol comprises transmission control protocol and Internet protocol (TCP/IP).

18. The information processing apparatus according to claim 1, wherein the second interface is configured to receive the data via a bus.

19. An information processing method of an information processing apparatus, the method comprising:
receiving, via a first interface, data described in a first protocol with an address and a port number over a communication network attached to the data;
transmitting, via the first interface, the data to a transmission destination indicated by the address and the port number;
receiving, via a second interface, data described in a second protocol via a communication path different from the communication network;
processing data having a predetermined port number attached thereto, described in the first protocol, and received via the first interface;
processing data, not containing a portion that is described in the first protocol, of the data received via the second interface;
analyzing the data received via the second interface to determine that the data received via the second interface contains data described in the first protocol;
attaching an address and a port number of the information processing apparatus on the communication network to the data received via the second interface; and
supplying the data with the address and the port number attached thereto to the first interface.

20. A non-transitory computer readable medium storing a program causing a computer to execute a process for processing information, the process comprising:
receiving, via a first interface, data described in a first protocol with an address and a port number over a communication network attached to the data;
transmitting, via the first interface, the data to a transmission destination indicated by the address and the port number;
receiving, via a second interface, data described in a second protocol via a communication path different from the communication network;
processing data having a predetermined port number, described in the first protocol, and received via the first interface;
processing data, not containing a portion that is described in the first protocol, of the data received via the second interface;
analyzing the data received via the second interface to determine that the data received via the second interface contains the data described in the first protocol;
attaching an address and a port number of the information processing apparatus on the communication network to the data received via the second interface; and
supplying the data with the address and the port number attached thereto to the first interface.

* * * * *